(12) United States Patent
Yoshioka

(10) Patent No.: US 6,802,791 B1
(45) Date of Patent: Oct. 12, 2004

(54) PRESSURE CONTROL VALVE FOR HYDRAULIC ACTUATION ASSEMBLY

(75) Inventor: Jun Yoshioka, Ft. Wayne, IN (US)

(73) Assignee: Torque-Traction Technologies, Inc., Maumee, OH (US)

( * ) Notice: Subject to any disclaimer, the term of this patent is extended or adjusted under 35 U.S.C. 154(b) by 0 days.

(21) Appl. No.: 10/106,225

(22) Filed: Mar. 27, 2002

(51) Int. Cl.$^7$ .............................................. F16H 48/30
(52) U.S. Cl. ........................ 475/88; 475/231; 475/249; 192/103 F; 137/539
(58) Field of Search ............................ 475/86, 88, 231, 475/249; 192/35, 82 T, 85 AA, 103 F; 137/539, 539.5, 454.4, 454.5, 513.7; 251/129.14, 129.08

(56) References Cited

U.S. PATENT DOCUMENTS

| | | | |
|---|---|---|---|
| 3,307,662 A | | 3/1967 | Henry-Biabaud |
| 3,894,556 A | * | 7/1975 | Pareja ........................ 137/539 |
| 3,987,689 A | * | 10/1976 | Engle ........................... 475/88 |
| 4,208,881 A | * | 6/1980 | Brademeyer et al. ......... 60/578 |
| 4,340,083 A | | 7/1982 | Cummins |
| 4,373,333 A | * | 2/1983 | Coleman ..................... 60/578 |
| 4,430,392 A | | 2/1984 | Kelley et al. |
| 4,532,768 A | * | 8/1985 | Focqueur ..................... 60/585 |
| 4,571,944 A | * | 2/1986 | Kubota ........................ 60/562 |
| 4,840,261 A | | 6/1989 | Oshidari et al. |
| 5,388,621 A | * | 2/1995 | Warren et al. ................ 141/21 |
| 5,404,904 A | * | 4/1995 | Glaser ........................ 137/539 |
| 5,595,214 A | | 1/1997 | Shaffer et al. |
| 5,967,180 A | * | 10/1999 | Yates, III .................... 137/539 |
| 6,017,332 A | * | 1/2000 | Urrutia ........................ 604/254 |
| 6,076,646 A | * | 6/2000 | Burns ..................... 192/85 AA |
| 6,120,408 A | * | 9/2000 | Yates, III et al. ........... 475/231 |
| 6,183,387 B1 | | 2/2001 | Yoshioka |
| 6,283,885 B1 | * | 9/2001 | Irwin .......................... 475/88 |
| 6,332,522 B1 | * | 12/2001 | Morse et al. ........... 192/85 AA |
| 6,342,022 B1 | | 1/2002 | Sturm |
| 6,413,182 B1 | * | 7/2002 | Yates et al. ................... 475/86 |
| 6,485,449 B2 | * | 11/2002 | Ito ................................. 604/9 |

FOREIGN PATENT DOCUMENTS

| | | | | |
|---|---|---|---|---|
| GB | 2121928 A | * | 1/1984 | .......... F16K/17/04 |
| JP | 60263790 | | 12/1985 | |

* cited by examiner

Primary Examiner—Roger Pang
Assistant Examiner—David D. Le
(74) Attorney, Agent, or Firm—Liniak, Berenato & White

(57) ABSTRACT

A pressure control valve assembly is disposed in the hydraulic flow path of a differential assembly and is connected to a passageway leading to a limited slip device within the differential case to establish fluid communication there between. The invention includes a machined or formed blind hole, a groove which partially intersects the blind hole, a ball member seated in the blind hole, and a spring resiliently acting on the ball to apply a force biasing the ball into the blind hole. At the intersection of the blind hole and groove, an area, which is not sealed by the ball, is formed that provides a controlled leakage path for the hydraulic fluid. As the hydraulic fluid flow increases, the hydraulic pressure of the fluid on the pressure side increases which increases the force on the ball acting against the spring. As the pressure increases further, the resultant forces on the ball deflect the spring to increase the bleed area and increase the fluid bled proportionally to the fluid pressure. Therefore, a pressure control mechanism is provided.

18 Claims, 3 Drawing Sheets

PRESSURE CONTROL VALVE FOR HYDRAULIC ACTUATION ASSEMBLY

BACKGROUND OF THE INVENTION a) Field of the Invention

This invention relates to a pressure control valve arrangement in a hydraulically-actuated differential or torque coupling device for use with a vehicle drive train, for example, a speed sensitive limited slip differential; and more particularly is directed to a multi-control valve assembly for a hydraulically actuated clutch pack in a torque coupling device.

b) Background of Related Art

Limited slip differentials and torque coupling devices are well known in the art. In such devices, a hydraulically actuated friction clutch pack is actuated to retard relative rotation of at least one of the rotating component, e.g., at least on side gears relative to the differential case. Normally, hydraulic pressure is directly increased in response to an increase in rotational speed differential of the axle components. One common way to provide the hydraulic pressure is to include an internal pump, or gerotor pump, within a differential case. As hydraulic pressure increases as a result of the increased speed of the pump (increased speed differential), there is a need to provide a pressure relief valve to provide relief from pressure build up in the limited slip device. In other words, once the hydraulic pressure reaches a predetermined level, the pressure relief valve relieves that pressure.

One such pressure relief valve of the related art is shown in FIG. 7. A ball is simply provided in a ball seat on the external surface of the differential case. The ball seat is in communication with hydraulic fluid of the limiting device. The ball is retained in the seat by a leaf spring secured to the outer surface of the differential case. As hydraulic pressure in the limiting device increased, the ball is forced against the leaf spring. If sufficient pressure exists, the leaf spring opens and fluid is allowed to flow out of the differential case. Otherwise, the valve remains closed.

It is also known to provide a hydraulic valve assembly including a bleed passage to control how the hydraulic pressure in the hydraulic system rises with increased flow. However, the prior art fails to adequately provide variable pressure control, linear and non-linear as well as thermosensitive compensation for changes in fluid viscosity with temperature.

The need therefore exists for an improved differential control valve that is simple in design, easy to assembly and opens and closes in a predictable and consistent manner, while integrating two distinct hydraulic flow and pressure mechanisms into a single assembly.

SUMMARY OF THE INVENTION

The present invention provides an improved pressure control valve for use in a limited slip differential or torque coupling device. A pressure control valve assembly is disposed in the hydraulic flow path of a differential assembly and is connected to a passageway leading to a limited slip device within the differential case to establish fluid communication there between.

In the preferred embodiment, the invention includes a machined or formed blind hole, a groove which partially intersects the blind hole, a ball member seated in the blind hole, and a spring resiliently acting on the ball to apply a force biasing the ball into the blind hole. At the intersection of the blind hole and groove, an area, which is not sealed by the ball, is formed that provides a controlled leakage path for the hydraulic fluid. As the hydraulic fluid flow increases, the hydraulic pressure of the fluid on the pressure side increases which increases the force on the ball acting against the spring. As the pressure increases further, the resultant forces on the ball deflect the spring to increase the bleed area and increase the fluid bled proportionally to the fluid pressure. Therefore, a pressure control mechanism is provided.

The pressure control valve controls the pressure flow in a manner that can be controlled by changing the dimensions of the hole, groove and ball. Hydraulic flow leakage and pressure control can vary with the force of the spring.

In a modified embodiment of this invention, a temperature sensitive spring is used (e.g., as a bi-metallic member) to allow the force on the ball to vary with temperature to either decrease upper pressure values at higher temperature or increase upper pressure with increase in temperature, or to provide compensation for change in fluid viscosity with temperature.

The objects, features and advantages of the present invention are readily apparent from the following detailed description of the best modes for carrying out the invention when taken in connection with the accompanying drawings.

DETAILED DESCRIPTION OF PREFERRED EMBODIMENTS

Figure 1:
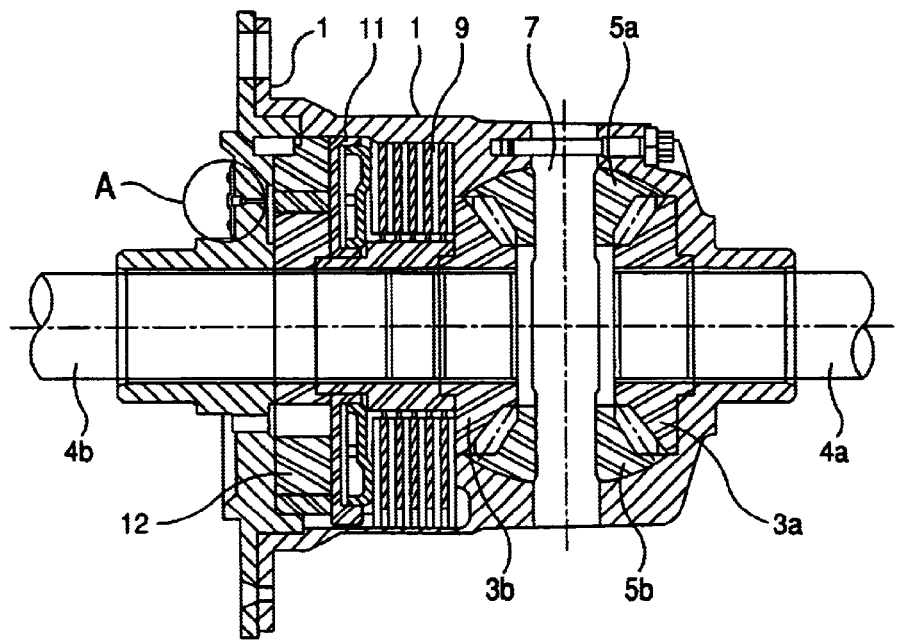
FIG. 1 is a sectional view of a limited slip differential employing the pressure control valve assembly of the present invention.

FIG. 1 is a cross sectional view of a limited slip differential employing the pressure control valve of the present invention. However, it is to be understood that while the present invention is described in relation to a speed sensitive limited slip differential, the present invention is equally suitable for use in a variety of torque coupling mechanisms using hydraulic pump systems, as well as other hydraulic couplings for a drive-train. A differential case 1 driven by a ring gear (not shown) houses a pair of side gears 3a, 3b a pair of pinion gears 5a, 5b and a pinion shaft 7 to allow speed differential between a pair of opposite output shafts 4a, 4b as is commonly known in the art. A limited slip device in the form of a clutch pack 9 is disposed between the side gear 3b and the differential case 1. A plurality of friction discs is alternately splined onto the side gear 3b and differential case 1. A hydraulically actuated piston 11 disposed within a piston chamber serves to compress the clutch pack 9 and retard any speed differential between the side gear 3b and differential case 1. This results in a retardation of any speed differential between the shafts 4a, 4b. Preferably a gerotor pump 12 is employed to provide pressurized hydraulic fluid to actuate the piston 11 and engage the clutch pack. In such an arrangement, as the relative speed between the output shafts 4a, 4b increases, the gerotor pump 12 pumps fluid to the piston chamber to actuate the clutch pack. As the speed increases, the pressure increases. In order to control and relieve pressure build up in the piston chamber, a self-contained pressure control valve assembly is disposed within the differential case 1.

Figure 2:
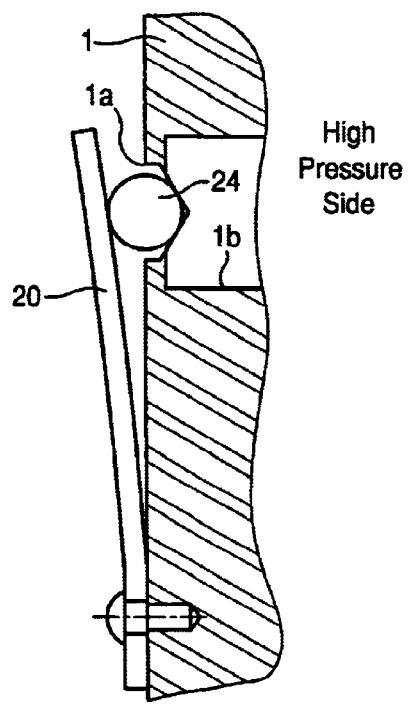
FIG. 2 is an enlarged sectional view of the pressure control valve assembly shown in FIG. 1.

FIG. 2 depicts one arrangement of the pressure control valve assembly according to the present invention.

FIG. 2 is an enlarged view of area A of FIG. 1. The pressure control valve of the present invention includes a spring shown in the form of a cantilever beam 20 in FIG. 2 mounted to the differential case 1 for resiliently acting on a ball member 24 disposed in blind hole 1a. A groove 1b is formed on the pressure side of the hydraulic actuation system, and the groove 1b partially intersects the hole 1a.

At the intersection of the blind hole 1a and groove 1b, an area, which is not sealed by the ball 24, is formed that provides a controlled leakage path 'P' for the hydraulic fluid. As the hydraulic fluid flow increases, the hydraulic pressure of the fluid on the pressure side increases which increases the force on the ball 24 acting against the spring 20. As the pressure increases further, the resultant forces on the ball deflect the spring 20 to increase the bleed area and increase the fluid bled proportionally to the fluid pressure. Therefore, a pressure control mechanism is provided.

Figure 3A:
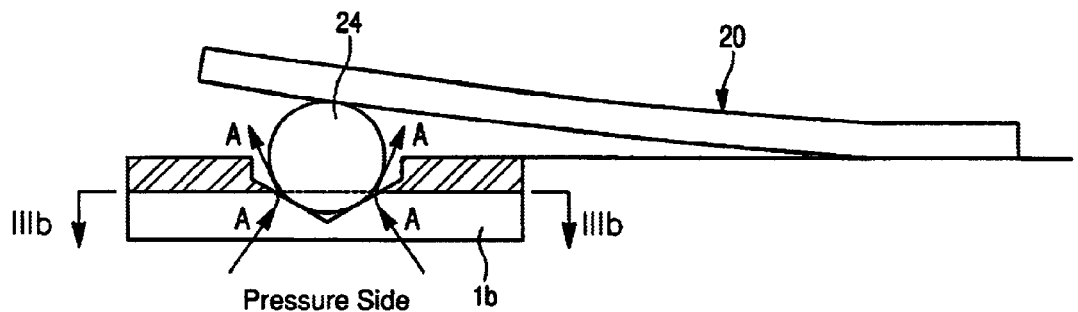
FIG. 3a is a partial cross section view of the pressure control valve according to a first embodiment of this invention.
Figure 3B:
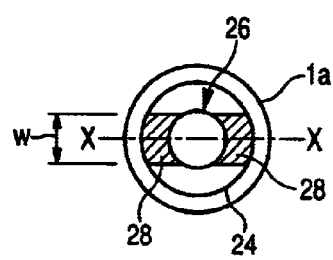
FIG. 3b is a sectional view of the pressure control valve assembly of FIG. 3a taken along line IIIb—IIIb.

FIGS. 3a and 3b schematically show the control valve assembly of FIG. 2 whereby the cantilevered beam 20 acts on the ball 24 to seat the ball in the blind hole 1a while the leakage path (see arrows 'A') remains at least partially open at the intersection of the hole 1a and groove 1b where there is formed a fluid bleed area 28. FIG. 3b shows a cross sectional view of FIG. 3a taken along line IIIb—IIIb whereby the groove is formed as an elongated notch along line x—x with a groove width 'w'. The ball contact area of the ball 24 is shown by reference numeral 26.

Figure 4:
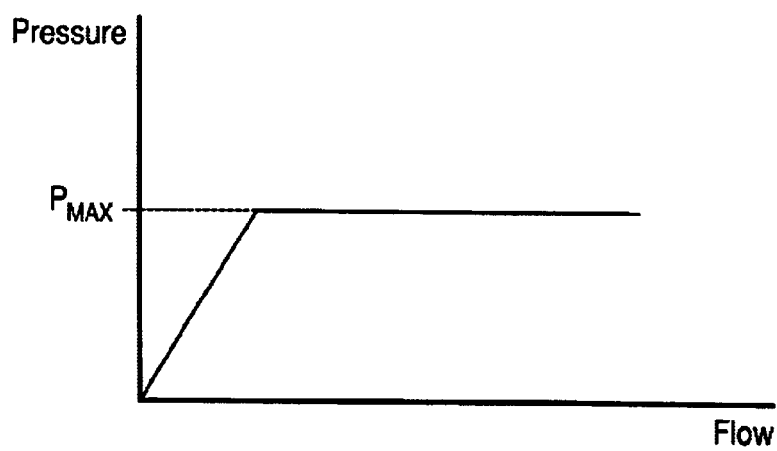
FIG. 4 represents a curve of pressure versus flow for the control valve of this invention.

The pressure control valve shown in FIGS. 2–3b controls the pressure flow in a manner that can be controlled by changing the dimensions of the hole 1a, groove 1b and ball 24. Hydraulic flow leakage and pressure control can vary with the force of the spring 20. FIG. 4 represents a curve of pressure versus flow for the control valve of this invention. It is noted however that the spring force may be selected to provide a variety of maximum pressures with respect to FIG. 4 and the invention may employ the use of non-linear springs.

Figure 5:
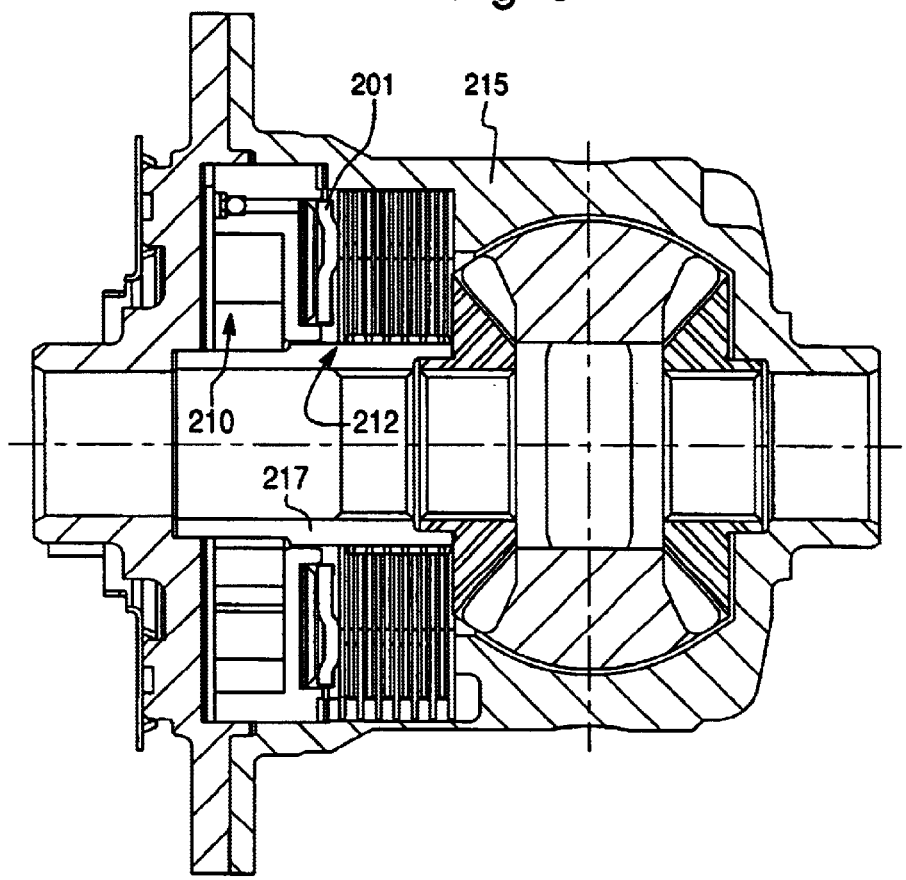
FIG. 5 shows as alternate application of the control valve system of this invention in a torque transfer mechanism.

FIG. 5 shows as alternate application of the control valve system described above with respect to FIGS. 2–4, whereby the control valve system is disposed in a system having an actuation piston 201 for a transfer system that couples the outer case member 215 and ring gear (not shown) to an inner sleeve member 217. A gerotor pump assembly 210 and clutch 212 is disposed between the outer case member 215 and inner sleeve member 217.

Figure 6:
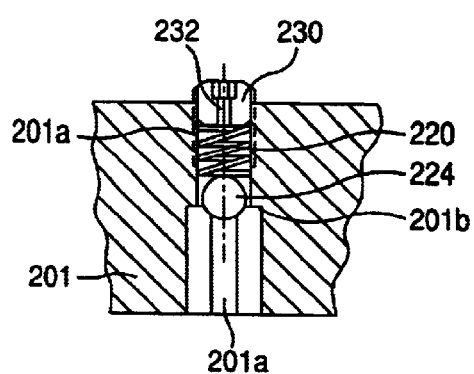
FIG. 6 is an enlarged sectional view of the pressure control valve assembly shown in FIG. 5 and embodying an alternate structural arrangement for the valve assembly.
Figure 7:
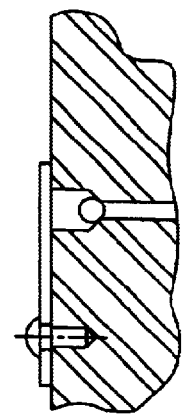
FIG. 7 is a sectional view of a related art pressure relief valve.

FIG. 6 is an enlarged view of area B of FIG. 5. The pressure control valve of the present invention includes a spring shown in the form of a coil spring 220 mounted to the actuation piston 201 for resiliently acting on a ball member 224 disposed in blind hole 201a. A groove 201b is formed on the pressure side of the hydraulic actuation system, and the groove 201b partially intersects the hole 201a. A screw or plug member 230 retains the ball 224 and spring 220 within the blind hole 201a via any suitable manner such as threads, friction fit, adhesive, welding etc. The screw or plug member 230 is formed with a suitable passageway 232 formed therein for permitting fluid flow therethrough.

As with the embodiment of FIGS. 2–4, at the intersection of the blind hole 201a and groove 201b, an area, which is not sealed by the ball 224, is formed that provides a controlled leakage path for the hydraulic fluid. As the hydraulic fluid flow increases, the hydraulic pressure of the fluid on the pressure side increases which increases the force on the ball 224 acting against the spring 220. As the pressure increases further, the resultant forces on the ball deflect the spring 220 to increase the bleed area and increase the fluid bled proportionally to the fluid pressure. Therefore, a pressure control mechanism is provided.

In a modified embodiment of this invention, a temperature sensitive spring is used (e.g., as a bi-metallic member) to allow the force on the ball to vary with temperature to either decrease upper pressure values at higher temperature or increase upper pressure with increase in temperature, or to provide compensation for change in fluid viscosity with temperature.

As apparent from the foregoing description, the valve system of this invention can be an assembly and installed in a component as a modular assembly, it can be separately mounted, or it can be integrated to a component as part of its design.

While the present invention has been shown and described with reference to specific embodiments forming the best mode, various changes in form and detail may be made without departing from the spirit and scope of the invention. While the best modes for carrying out the invention have been described in detail, those familiar with the art to which this invention relates will recognize various alternatives, designs and embodiments for practicing the present invention as defined by the following claims. For example, the present invention may be used in a direct torque coupling arrangement where speed sensitive coupling between the shafts 4a, and 4b are desired. Additionally, the surface forming the seating component for the ball may be formed on an insert piece that is threaded into a tap hole, whereby the ball is seated on the insert piece and resiliently held in place by a suitable spring member.

What is claimed is:

1. A pressure control valve assembly, comprising:

an intermediate member separating a first area of high pressure with a second area of low pressure;

a bore defining a blind hole extending from said first area to said second area to provide fluid communication therebetween;

a groove which partially intersects the blind hole, said groove being disposed on a high pressure side of said intermediate member, said groove extending along a length of said bore from said first area to said blind hole;

a ball member seated in the blind hole, said ball member disposed on a low pressure side of said intermediate member; and a spring resiliently acting on the ball member to apply a force biasing the ball into the blind hole, wherein at an intersection of the blind hole and groove, an area is formed that provides a controlled leakage path for the hydraulic fluid when said ball member is seated in said blind hole, wherein as flow of the hydraulic fluid increases, hydraulic pressure of the fluid on the first area of high pressure increases which increases the force on the ball acting against the spring, and wherein fluid disposed in said first area of high pressure actuates a limited slip device within a differential gear assembly.

2. The valve assembly according to claim 1, wherein as the pressure further increases, a resultant forces on the ball member deflect the spring to increase the bleed area and increase the fluid bled proportionally to the fluid pressure.

3. The valve assembly according to claim 1, wherein said intermediate member is a differential case of a differential gear assembly.

4. The valve assembly according to claim 1, wherein said intermediate member is an actuation piston for applying axial force to a limited slip device of a differential gear assembly.

5. The valve assembly according to claim 1, wherein said spring is a cantilevered beam affixed to said intermediate member.

6. The valve assembly according to claim 1, wherein said spring is formed of a temperature sensitive material having a spring force that varies with changes in temperature.

7. The valve assembly according to claim 1, wherein an area defined by said controlled leakage path may be varied by changing dimensions of at least one said blind hole, said groove and said ball member.

8. A pressure control valve assembly in a differential axle assembly comprising:

a differential case containing a differential gear assembly driven by an input shaft and adapted to allow differential rotational speed between a pair of opposing output shafts;

a hydraulic flow path for hydraulic fluid of said differential gear assembly leading to a limited slip device within the differential case;

a valve member comprising:
a bore defining a blind hole disposed in said differential case;
a groove which partially intersects the blind hole, said groove being disposed on a high pressure side of said differential case, said groove extending along a length of said bore and extending from said high pressure side to said blind hole;
a ball member seated in the blind hole adjacent said groove; and
a spring resiliently acting on the ball member to apply a force biasing the ball member into the blind hole toward said high pressure side, wherein at an intersection of the blind hole and groove, an area is formed that provides a controlled leakage path for the hydraulic fluid, and wherein as flow of the hydraulic fluid increases, hydraulic pressure of the fluid on the high pressure side increases which increases the force on the ball member acting against the spring.

9. The valve assembly according to claim 8, wherein as the pressure further increases, a resultant forces on the ball member deflect the spring to increase the bleed area and increase the fluid bled proportionally to the fluid pressure.

10. The valve assembly according to claim 8, wherein said spring and ball member are removably secured to said differential case.

11. The valve assembly according to claim 8, wherein said spring is a cantilevered beam affixed to said differential case.

12. The valve assembly according to claim 8, wherein said spring is a coil spring mounted to said differential case.

13. A pressure control valve assembly in a torque coupling assembly comprising:

a torque input member driven by an input shaft;

a torque output member receiving torque from said torque input member;

a clutch device for drivingly connecting said torque input member with said torque output member;

a hydraulic actuation assembly for actuating said clutch device;

a hydraulic flow path for hydraulic fluid of said hydraulic actuation assembly leading from a first area of high pressure to a second area of low pressure;

a valve assembly interposed between said first area of high pressure and said second area of low pressure, said valve assembly comprising:
a bore defining a blind hole disposed in an intermediate member of said actuation assembly;
a groove which partially intersects the blind hole, said groove being disposed on a high pressure side of said intermediate member and extending along a length of said bore from said first area to said blind hole;
a ball member seated in the blind hole opposite said groove with respect to said intermediate member; and
a spring resiliently acting on the ball member to apply a force biasing the ball member into the blind hole toward said high pressure side, wherein at an intersection of the blind hole and groove, an area is formed that provides a controlled leakage path for the hydraulic fluid, and wherein as flow of the hydraulic fluid increases, hydraulic pressure of the fluid on the high pressure side increases which increases the force on the ball member acting against the spring.

14. The valve assembly according to claim 13, wherein as the pressure further increases, a resultant forces on the ball deflect the spring to increase the bleed area and increase the fluid bled proportionally to the fluid pressure.

15. The valve assembly according to claim 13, wherein said intermediate member is an actuation piston actuating said clutch device.

16. The valve assembly according to claim 15, wherein said spring is a cantilevered beam affixed to said actuation piston.

17. The valve assembly according to claim 15, wherein said spring is a coil spring mounted to said actuation piston.

18. The valve assembly according to claim 13, wherein said spring is formed of a temperature sensitive material having a spring force that varies with changes in temperature.

* * * * *